US010084623B1

(12) United States Patent
Mactaggart et al.

(10) Patent No.: US 10,084,623 B1
(45) Date of Patent: Sep. 25, 2018

(54) MULTICHANNEL CDR WITH SHARING OF ADAPTATION HINTS AND LEARNING

(71) Applicant: Fmax Technologies, Inc., Eden Prairie, MN (US)

(72) Inventors: Iain Ross Mactaggart, Eden Prairie, MN (US); David Erich Tetzlaff, Minnetonka, MN (US)

(73) Assignee: Fmax Technologies, Inc., Eden Prairie, MN (US)

( * ) Notice: Subject to any disclaimer, the term of this patent is extended or adjusted under 35 U.S.C. 154(b) by 0 days.

(21) Appl. No.: 14/946,397

(22) Filed: Nov. 19, 2015

Related U.S. Application Data

(60) Provisional application No. 62/082,029, filed on Nov. 19, 2014.

(51) Int. Cl.
    *H04L 25/03*     (2006.01)
    *H04L 27/01*     (2006.01)
    *H04L 7/00*      (2006.01)

(52) U.S. Cl.
    CPC ...... *H04L 25/03828* (2013.01); *H04L 7/0033* (2013.01); *H04L 27/01* (2013.01)

(58) Field of Classification Search
    CPC ............................................... H04L 25/03828
    USPC .......................................................... 375/232
    See application file for complete search history.

(56) References Cited

U.S. PATENT DOCUMENTS

| | | | | |
|---|---|---|---|---|
| 6,526,112 B1* | 2/2003 | Lai | ............................ | H03L 7/07 375/375 |
| 8,050,373 B2* | 11/2011 | Buchwald | ............. | H04L 7/0091 327/147 |
| 8,610,476 B1* | 12/2013 | Soh | ........................ | H03L 7/0807 327/159 |
| 2010/0097251 A1* | 4/2010 | Liu | ........................ | H03L 7/0812 341/111 |
| 2013/0202065 A1* | 8/2013 | Chmelar | ........... | H04L 25/03057 375/340 |
| 2013/0214829 A1* | 8/2013 | Talwalkar | ............... | G09G 5/008 327/156 |
| 2013/0262909 A1* | 10/2013 | Yang | ........................ | G06F 1/08 713/501 |
| 2014/0254653 A1* | 9/2014 | Nguyen | ................ | H04L 7/0008 375/224 |
| 2015/0146834 A1* | 5/2015 | Marshall | ............... | H04L 7/0025 375/376 |
| 2015/0249454 A1* | 9/2015 | Giaconi | ................ | H03L 7/0814 375/376 |

\* cited by examiner

*Primary Examiner* — Michael Neff
(74) *Attorney, Agent, or Firm* — Schwegman Lundberg & Woessner, P.A.

(57) ABSTRACT

Apparatus and methods are provide for a multichannel clock and data recovery (CDR) device that shares information between channels. In an example, a multiple channel communication circuit can include a plurality of clock and data recovery (CDR) circuits, each CDR circuit of the plurality of CDR circuits associated with a channel of the multiple channel communication circuit. In certain examples, each CDR circuit can be configured to detect an incoming stream of data from the channel, to determine a setting of one or more parameters for correctly sampling the data from the incoming stream, and to share an indication of the setting of the one or more parameters to an adjacent CDR circuit of the plurality of CDR circuits.

22 Claims, 8 Drawing Sheets

MULTICHANNEL CDR WITH SHARING OF ADAPTATION HINTS AND LEARNING

PRIORITY APPLICATION

This application claims the benefit of priority under 35 U.S.C. 119(e) to Mactaggart, U.S. Provisional Patent Application Ser. No. 62/082,029, filed on Nov. 19, 2014, which is incorporated herein by reference in its entirety.

BACKGROUND

Various communication protocols such as IEEE 802.3, also known as Ethernet, use multiple lanes of serial data to increase the bandwidth of communication links. These links may use electrical signaling for the entire path, or combination of electrical and optical signaling for different parts of the path. Most of the high speed protocols use an embedded clock in the data stream. Clock and data recovery (CDR) circuits are used to recover the data at the destination. As the data rate of each lane increases, signal integrity is an issue that becomes more challenging. Some of the solutions to signal integrity are transmitter and receiver equalization, performing clock and data recovery at points along the data channel, and crosstalk cancellation. Some protocols such as Ethernet 10G BaseT inherently have all of the lanes operating with the same clock frequency, and can require sharing of transmitted and received data between channels for the purpose of crosstalk cancellation. In multi-channel CDR circuits opportunities exist to improve the ability of the channels to adapt to the data characteristics.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In certain examples of the present subject matter, a multichannel CDR integrated circuit can provide enhanced adaptation of the CDRs to the data being received by the channels. As data rates and communications link lengths increase, the ability of all the channels in the CDR to adapt to the data, and correctly sample the data, can be compromised. The present subject matter can use the sharing of information between channels to enhance the ability of each channel to adapt to the data. In certain examples, adaptations for any channel can include acquiring the frequency and phase of the data, adjusting the input and output equalization to compensate for the non-ideal spectral characteristics of the channel, and adjusting sampling phase and threshold for an optimal BER.

In general, two forms of sharing of information are suggested: direct peer to peer information sharing, and sharing through an intermediary. Peer to peer sharing can include sharing between adjacent CDR circuits, or with all CDR circuits. Sharing through an intermediary can include sharing through a CDR to a type of master to other CDRs, or a CDR to a hub to other CDRs.

The degree of improvement can be represented mathematically and mathematical statistics based on CDR parameter sharing and learning are compelling. For example, if each channel in a link has a 99% chance of adapting to and correctly sampling the data stream, then the overall probability of a 16 channel link locking is only 85% ($0.99^{16}$). By contrast, the probability of at least one of the channels locking, and correctly sampling, is greater than 99.999999% ($1-0.01^{16}$). If the channels that adapt successfully can assist the other channels, then the probably of all the channels locking can increase many orders of magnitude.

Figure 1:
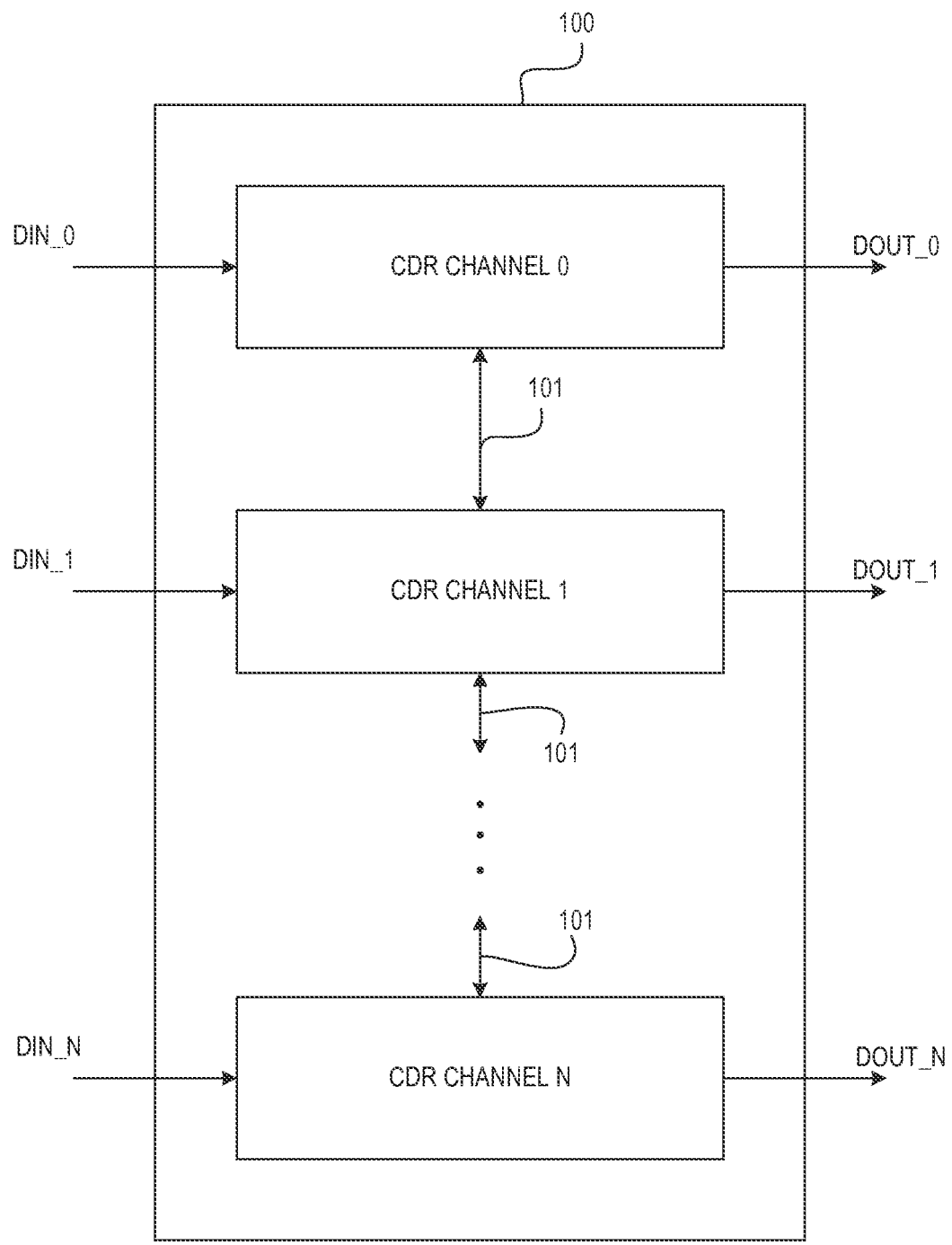
FIG. 1 illustrates generally an example multichannel CDR with information sharing between channels.

FIG. 1 illustrates generally an example multichannel CDR 100 with information sharing between channels. In certain examples, a CDR channel (0, 1, . . . , N) of the multichannel CDR 100 can receive and transmit data (DIN_X, DOUT_X) in which the data can be represented by differential, non-return-to-zero (NRZ) data streams. It is understood that other coding forms including, but not limited to, pulse-amplitude modulation (PAM), can be associated with the received or transmitted data. In certain examples, single-ended or differential signaling can be used, data can be one or more bits wide, and receive signaling can be different than transmit signaling. In certain examples, received data (DIN_X) can be one bit wide, and transmit data (DOUT_X) can be multiple bits wide, as in a data deserializer, or received data (DIN_X) can be multiple bits wide, and transmit data (DOUT_X) can be one bit wide as in a data serializer. In some examples, multiple CDR channels can be combined to a single higher speed output, or a single input can be split into several lower speed outputs. For example, but not limited to, four 25 GHz input signals can be received and mixed together on a single 100 GHz output signal. In another example, a 50 GHz PAM4 Ethernet input signal can be split into two 25 GHz NRZ output signals and vice versa. In certain examples, information 101 can be shared between controllers of the CDR channels. In some examples, information 101 can be shared between one or two logically or physically adjacent CDR channel controllers. In some examples, the shared information 101 can include information to assist other channels in locking on to the incoming data stream (DIN_X).

Figure 2A:
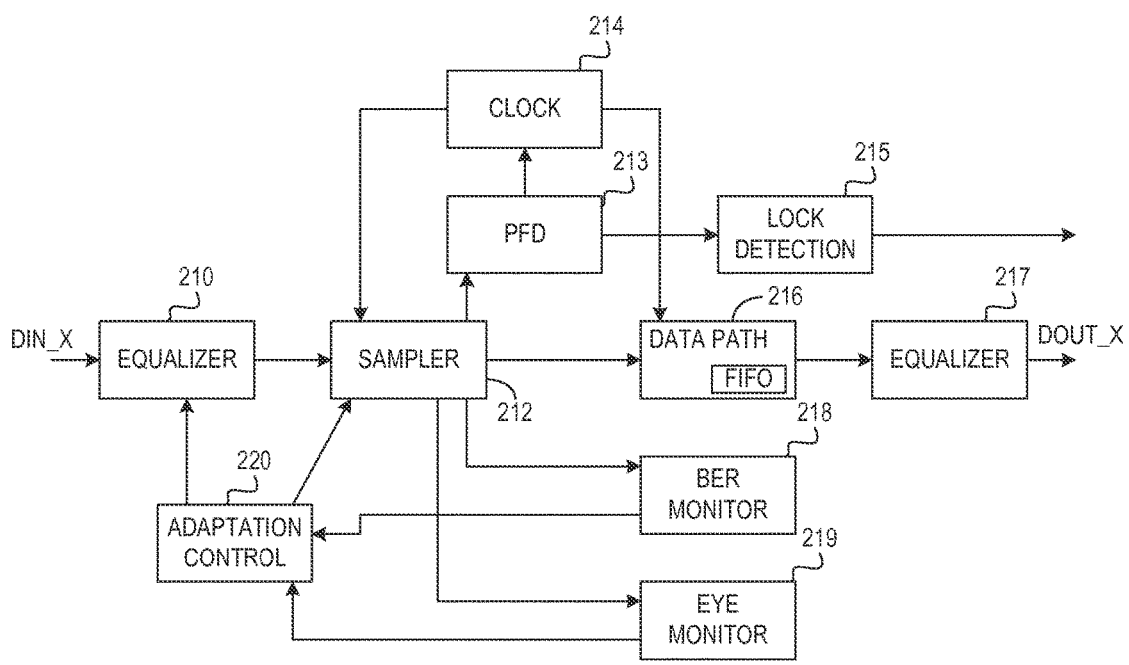
FIG. 2A illustrates generally a block diagram of an example CDR channel.

FIG. 2A illustrates generally a block diagram of an example CDR channel. Input data (DIN_X) can be received by an input stage that can include an equalizer 210 with an equalization control. In certain examples, the equalization control can set parameters or coefficients of the equalizer 210 to compensate for spectral characteristics of the channel. In certain examples, the equalization control can be continuously adaptive to optimize the equalization. Various forms of equalization can be used, such as Continuous Time Linear Equalization (CTLE) or Decision Feedback Equalization (DFE).

In certain examples, the data sampler 212 can capture samples of the equalizer output at approximately the center of the data period and can convert the samples to digital data. In some examples, the data sampler 212 can also capture samples at other points in the data period for frequency and phase acquisition. In certain examples, the frequency and phase detector 213 can use the information from the data sampler 212 to determine if the clock frequency and phase need to be adjusted or reconfigured for the data sampler 212 to sample in the center or the optimal point in the data period. Outputs of the frequency and phase detector 213 can direct the clock generator 214 to determine and change a setting of the clock frequency and/or phase. In some examples, the outputs of the frequency and phase detector 213 can also be used by the lock detector 215 to determine if the data sampler 212 is sampling at the optimal point in the period and that the CDR is locked to the data.

In certain examples, data samples can be reconstructed into an output data stream in the data path 216, which can include a FIFO buffer to accommodate a clock domain crossing between the sampler clock and output clock. In some examples, the output stage typically can include output equalizer 217. A Bit Error Rate (BER) monitor 218 and an Eye Monitor 219 can be included to evaluate the quality of the communications link and the data recovery. An Adaptation Control 220 can provide a supervisory function that can control the overall adaptation of the CDR. Information from the BER Monitor 218 and Eye Monitor 219 can be used to guide the overall adaptation process. If the performance of one channel is significantly worse than its peers, such a discrepancy can be an indication additional adaptation is required.

Figure 2B:
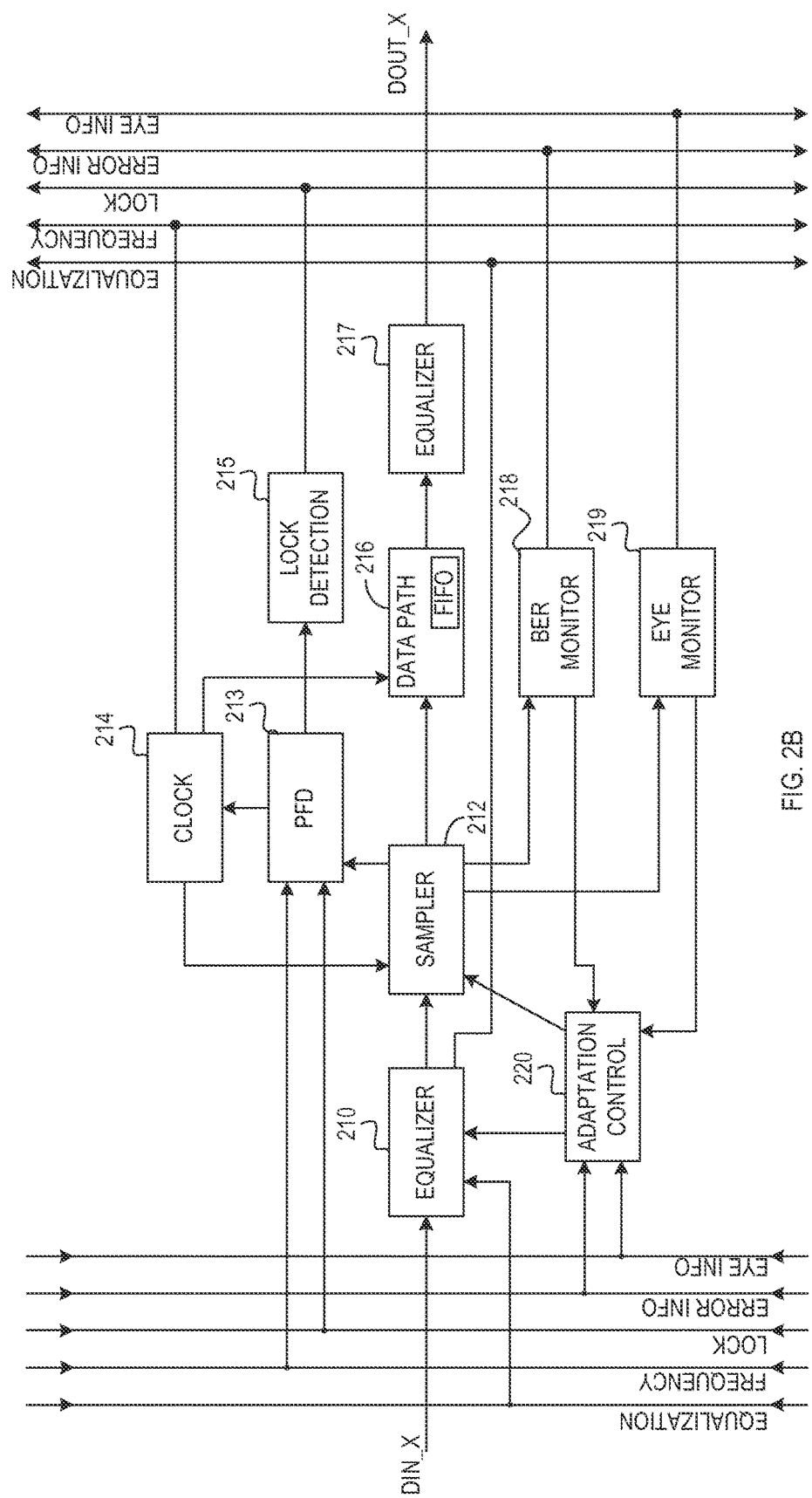
FIG. 2B illustrates generally example information that can be shared between CDR channels of an example system.

FIG. 2B illustrates generally example information that can be shared between CDR channels of an example system. FIG. 2B also shows graphical example source and destination locations of the shared information. In an example, an equalization state of one CDR can be used by another CDR as hint or suggested starting point for the equalization adaptation of the other CDR. In certain examples, historical adaptation information can be saved and can be applied immediately at the beginning of an adaptation sequence. In certain examples, input equalization can be provided by an equalizer of a locked-on channel and can be used by an equalizer of a second, un-locked channel. In certain examples, sample frequency or a representation of sample frequency can be provided by a frequency generator or phase interpolator of a locked-on channel and can be used by a frequency and phase detector of a second un-locked channel. In certain examples, a discrete lock-on indication can be provided by a locked-on channel and can be used by a frequency and phase detector of a second un-locked channel. In certain examples, BER information can be provided from a BER circuit of a locked-on channel and can be used by an adaptation control of a second un-locked channel. In certain examples, signal eye information can be provided from an eye monitor of a locked-on channel and can be used by an adaptation control of a second un-locked channel. In certain examples, BER information and signal eye information can provide an un-locked channel an indication that more adaptation can be done if the incoming BER and signal eye information shows significantly better signal quality that the channels own BER and signal eye information.

In certain examples, the clock frequency of a channel that has successfully locked to data can be used as a suggested or approximate frequency for another channel. The frequency detector of the receiving channel can use clock frequency information from another channel as a reference and can adjust the CDR to the same frequency as a step in the CDR lock process. In some examples, BER information or the eye monitor information from a channel that has successfully locked to data can guide another channel in the adaptation process.

Figure 3:
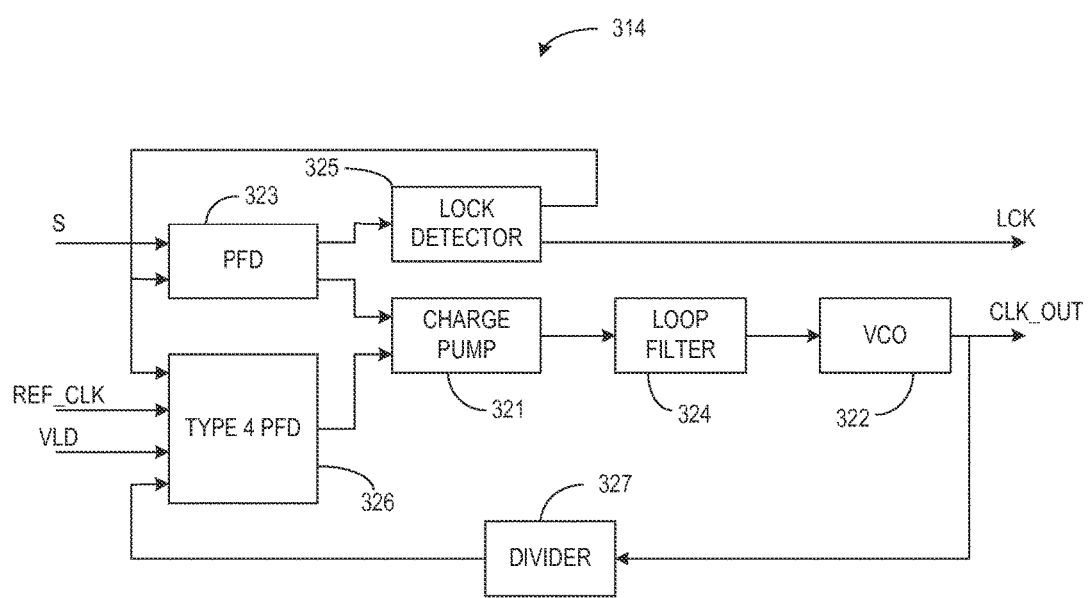
FIG. 3 illustrates generally a phase-lock loop (PLL) in an example CDR channel.

FIG. 3 illustrates generally a phase-lock loop (PLL) 314 in an example CDR channel. In certain examples, the PLL 314 can generate a clock signal (CLK_OUT) and can include a charge pump 321, and a local voltage controlled oscillator (VCO) 322. The charge pump 321 can receive frequency reference information and can provide a voltage input to the local VCO 322. In certain examples, a loop filter 324 can process the output of the charge pump 321 to provide the input voltage for the local VCO 322. The local VCO 322 can use the voltage input to provide a clock signal (CLK_OUT) at a frequency based on the received voltage. In certain examples, the PLL 314 can includes a phase and frequency detector (PFD) 323. The phase and frequency detector 323 can receive data sample information (S) from a data sampler of the CDR and can provide information about the actual frequency and phase of the incoming data stream. The phase and frequency detector 323 can provide adjustment information to the charge pump 321 based on the received sample information.

In certain examples, the charge pump 321 can drive a loop filter 324 to output voltage in the direction needed to adjust the frequency or phase of the local VCO 322. In certain examples, the PLL can include a lock detector 325 and if the channel has locked to data, the lock detector 325 can forward a lock indication signal (LCK) to other channels of a multichannel CDR. In certain examples, the clock signal or a divided clock signal can accompany the forwarded lock indication. In certain examples, the forwarded frequency can be lowered by a divider 327.

In certain examples, where a CDR channel has not locked on to the data stream, a PLL 314 of the channel can use a forwarded clock (REF_CLK) in a type 4 phase and frequency detector 326 to lock the local VCO 322 to the forwarded frequency. In certain examples, a validation signal (VLD) can accompany the forwarded clock (REF_CLK) to provide an indication of whether the forwarded clock (REF_CLK) is from a channel that has locked to an incoming data stream. In certain examples, the PLL 314 can include additional circuitry to compensate for a forwarded clock (REF_CLK) having a lowered or divided frequency.

In an example CDR with multiple channels and multiple forwarded frequency inputs arriving at a channel, an arbitration issue can arise. An example method of selecting which input to use can include using the available frequency from the first channel that locks, and to keep using that frequency unless it unlocks. If it unlocks, then the frequency from any locked channel can be used. In an example system with learning, a forwarded frequency that has a history of being a beneficial lock aide can be used even before that frequency is locked to data. The same type of algorithm can be used for other shared information.

Figure 4:
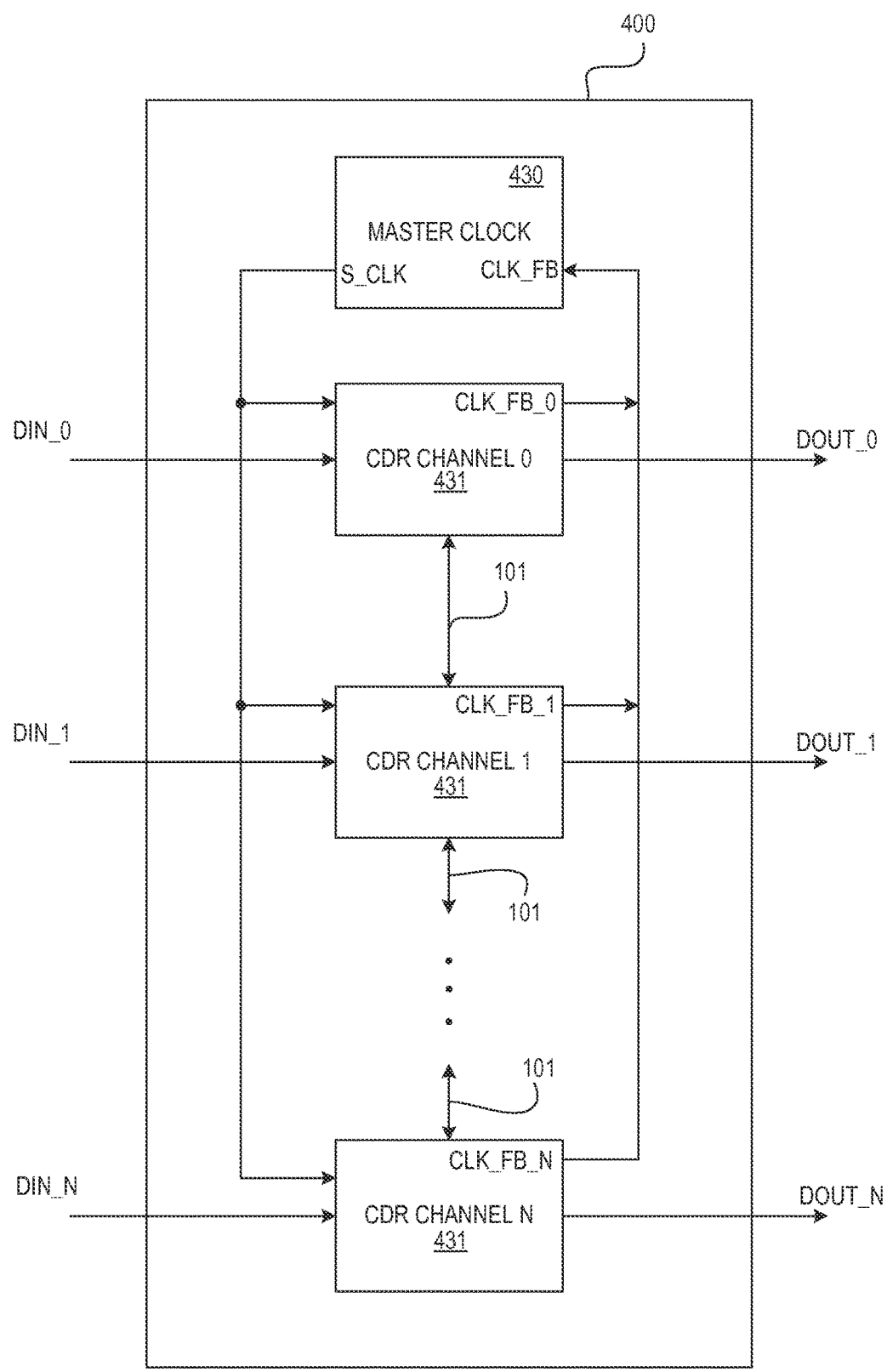
FIG. 4 illustrates generally a multichannel CDR with a shared master clock 430.

FIG. 4 illustrates generally a multichannel CDR 400 with a shared master clock generator 430. The multichannel CDR 400 can include a plurality of clock and data recovery (CDR) channels (0, 1, . . . , N) 431. Each channel can receive a stream of data (DIN_X) and provide a stream of data (DOUT_X). The shared master clock can reduce the area or power required for the multichannel CDR 400 as it reduces the need for each channel to have a clock generator, and can also provide a means of sharing frequency information between channels. In certain examples, the master clock can receive reference clock information (not shown) and can provide sampling clock information (S_CLK) to each of the CDR channels 431. The individual channels can provide frequency guidance information (CLK_FB) to the shared master clock generator 430, and the shared master clock generator 430 can combine the frequency guidance information (CLK_FB0 . . . CLK_FBn) from more than one CDR channel 431 to adjust a frequency of the sampling clock information (S_CLK). The sampling clock information (S_CLK) can be used by all the CDR channels 431, for example, as a target or starting point, where those channels are all using a common frequency (data rate) or are using a narrow band around a common frequency (data rate). The frequency feedback, or frequency guidance information (CLK_FBx), can include guidance on frequency adjustments by the shared master clock generator 430, and can, in some examples, also include a quality metric for the guidance. In certain examples, a high quality metric can indicate that there is high confidence in the guidance provided, and a low metric can indicate that the confidence is low. A simple quality metric can be the beat frequency of a frequency detector output. The beat frequency can be the difference between the data rate and the sampling clock. A stable beat frequency and a lower beat frequency can suggest higher confidence in the frequency detector output.

Figure 5:
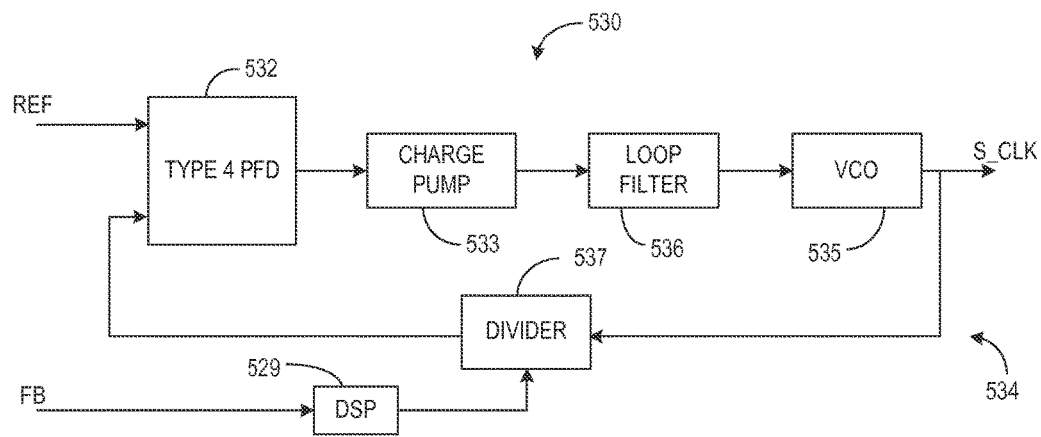
FIG. 5 generally illustrates detail of an example master clock generator.

FIG. 5 generally illustrates detail of an example master clock generator 530. The master clock generator 530 can include a digital signal processor 529, and a PLL that can include a type 4 PFD 532, a charge pump 533, a feedback processing path 534 and a VCO 535. In certain examples, the PLL can include a loop filter 536. In some examples, the PLL can include a fractional divider 537 in the feedback processing path 534. In certain examples, the master clock generator 530 can receive frequency feedback information (FB) from one or more other channels of a multichannel CDR. The frequency feedback information can be processed and combined by the DSP 529. The DSP 529 can use both a frequency adjustment and a quality metric received from each channel. The DSP 529 can select a divide value for the fractional divider 537 in a feedback processing path 534 of the PLL. In certain examples, the fractional divider 537 can be implemented with many techniques, including a fractional divider such as the fractional divider discussed in U.S. Pat. Nos. 8,319,563 and 8,890,595, which are hereby incorporated by reference herein in their entirety. For optimal jitter performance, the reference clock generator for providing a reference clock signal (REF) to the PLL can be a low noise quartz based oscillator. In certain examples, the fractional divide output frequency can be adjusted to match the reference frequency. A PLL in this configuration can impose the low noise spectrum on the quartz oscillator below the loop bandwidth of the PLL on the output of the PLL. A PLL in this configuration can create a very low noise clock for use by the individual channels. In systems with learning, channels that historically provide the most beneficially guidance can be given the greatest priority at the beginning of a lock sequence. In certain examples, when a master clock signal (S_CLK) is shared between channels, each channel can adjust a phase of the clock signal to allow the data sampler to capture data samples at an optimal or near optimal sample point. In certain examples, it can be beneficial for a multichannel CDR to use the master clock to generate a low jitter output data stream.

Figure 6:
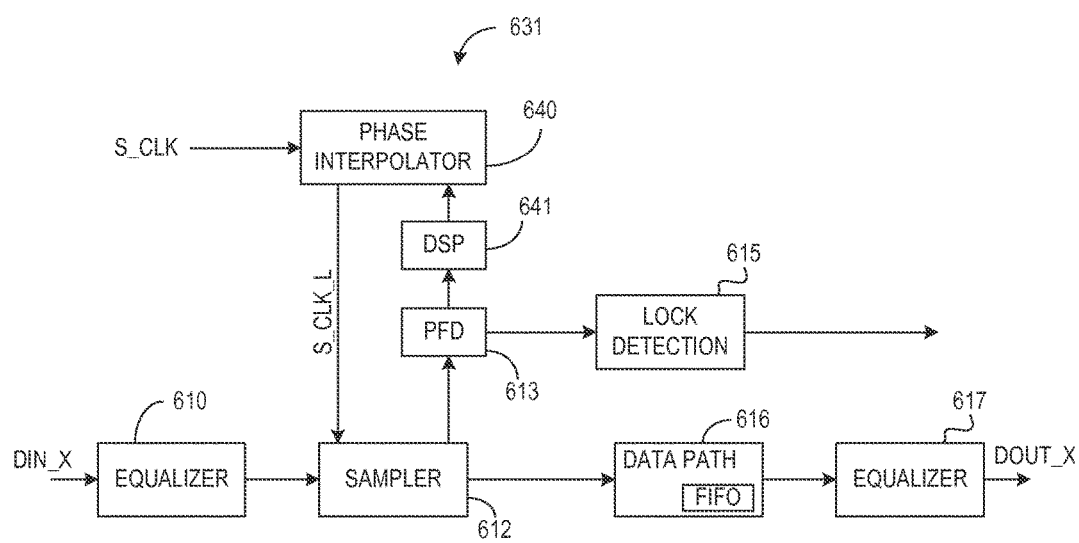
FIG. 6 illustrates generally details of an example CDR channel of a multichannel CDR.

FIG. 6Error! Reference source not found. illustrates generally details of an example CDR channel 631 of a multichannel CDR. In certain examples, the CDR channel 631 can include a phase interpolator 640, input equalizer 610, data sampler 612, data path 616, output equalizer 617, DSP 641, PFD 613 and lock detector 615.

In certain examples, the input equalizer 610 can include an equalizer control. In certain examples, the input equalizer 610 can set parameters or coefficients to compensate for spectral characteristics of the CDR channel 631. In certain examples, the input equalizer 610 can be continuously adaptive to optimize the equalization. Various forms of equalization can be used, such as Continuous Time Linear Equalization (CTLE) or Decision Feedback Equalization (DFE).

In certain examples, the phase interpolator can receive the sampling clock information (S_CLK) from the master clock generator of the multichannel CDR, can adjust phase of the sampling clock information (S_CLK) and can provide local sample clock information (S_CLK_L) to the data sampler 612. In certain examples, a phase rotator can also compensate for small frequency differences between the data and the master clock. U.S. Pat. Nos. 8,319,563 and 8,890,595 discuss example fractional dividers and phase interpolators that can be implemented in an example system and are each hereby incorporated by reference herein in their entirety.

In certain examples, the data sampler 612 can capture samples of output from the input equalizer 610 at approximately the center of the data period and can convert the samples to digital data. In some examples, the data sampler 612 can also capture samples at other points in the data period for frequency and phase acquisition. In certain examples, the phase and frequency detector (PFD) 613 can use the information from the data sampler 612 to determine if the clock frequency and phase can be adjusted for the data sampler 612 to sample in the center or the optimal point in the data period. Outputs of the PFD 613 can direct the phase interpolator 640 to change the sample clock phase. In some examples, the outputs of the PFD 613 can also be used by the lock detector 615 to determine if the data sampler 612 is sampling at the optimal point in the period and that the CDR channel is locked to the incoming data stream. In some examples, the phase interpolator 640 includes digital inputs, such that a DSP 641 can process output information of the PFD 613 and provide it to the digital inputs of the phase interpolator 640.

In certain examples, data samples can be reconstructed into an output data stream in the data path 616. In some examples, the output stage optionally can include an output equalizer 617. In some examples, the data path 616 can include a FIFO to compensate for unpredictable and variable phase relationship between the sampling clock and an output clock. In such examples, the FIFO can use the sampler clock domain to load the FIFO, and the output clock domain to read the FIFO, where the output clock can be S-CLK in some examples. In some examples, a bit error rate (BER) monitor or an eye monitor can be included to evaluate the quality of the communication link and the data recovery adaptation of the CDR channel 631. In some examples, an adaptation control can provide a supervisory function that can receive information from the data sampler, lock detector and optional components such as the BER monitor and eye monitor and can control the overall adaptation of the CDR channel 631.

Figure 7:
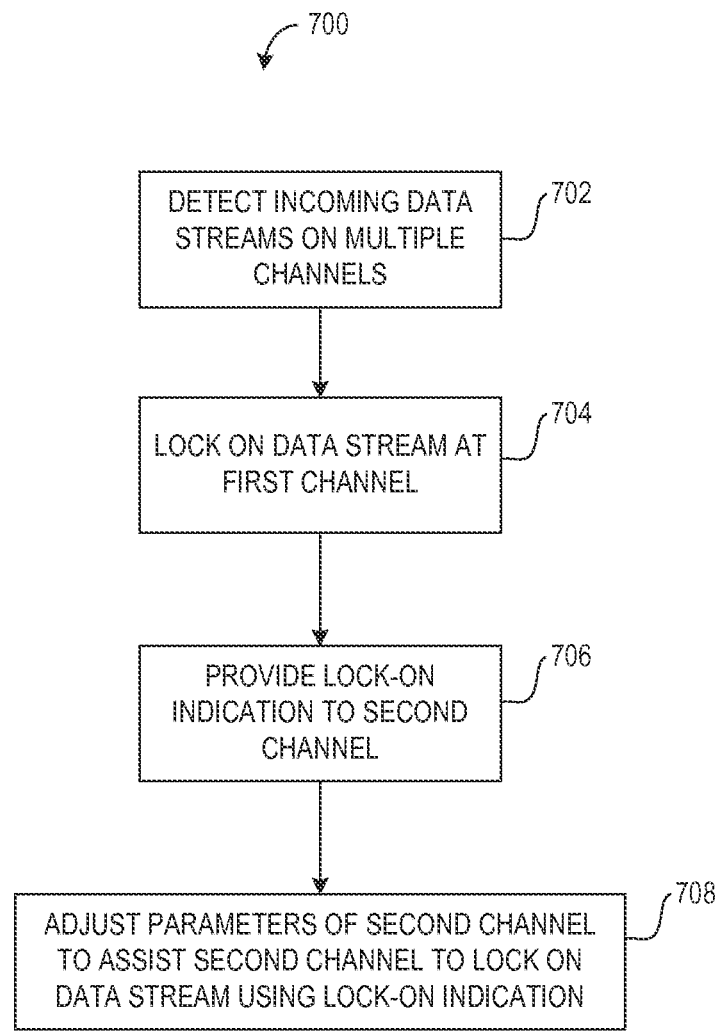
FIG. 7 illustrates generally a flowchart of an example method for operating a multiple channel CDR.

FIG. 7 illustrates generally a flowchart of an example method 700 for operating a multiple channel CDR. At 702, the multiple channel CDR can detect incoming data streams on multiple channels. At 704, a first channel can lock on to a first data stream. At 706, the first channel can provide an lock-on indication to a second channel of the multiple channel CDR. In certain examples, the lock-on indication can include, but is not limited to, a discrete indication, sampling frequency information, sampling phase information, incoming equalization information, or BER information, eye monitor information, or combinations thereof. At 708, the second channel can adjust parameters using the indication received from the first channel.

In certain examples, the present subject matter describes multichannel CDRs where the channels can share adaptation information with other channels. The channels with successful adaptation can share information with weaker channels to aide their adaptation. Shared information can include, but is not limited to, information regarding data sample frequency, data sample phase, input data equalization, output data equalization, channel quality status, or combinations thereof.

It is understood that although the description illustrates the use of analog signal processing in some cases and digital signal processing in others the type of processing can vary between examples without departing from the scope of the present subject matter. In certain examples, a multiple channel CDR, or multichannel CDR or multi-channel CDR, can share properties between channels where such properties include, but are not limited to frequency, phase, spectral characteristics, eye quality metrics, bit error rate. Such sharing can be used as hints between channels to aid adaptation and learning of channel or data communication properties of the channel.

In certain examples, data frequency information can be shared as hints between channels to aid adaptation. Frequency information can be shared in the form of a recovered clock or divided recovered clock. Shared recovered clock information can be used to drive an oscillator, clock or phase interpolator of a channel to a known frequency or phase to aid data lock of the channel to an incoming data stream. Use of shared recovered clock from 2 or more adjacent channels, provided with a lock indication, where the first clock to be locked can be used until it loses lock or until the channel locks.

Figure 8:
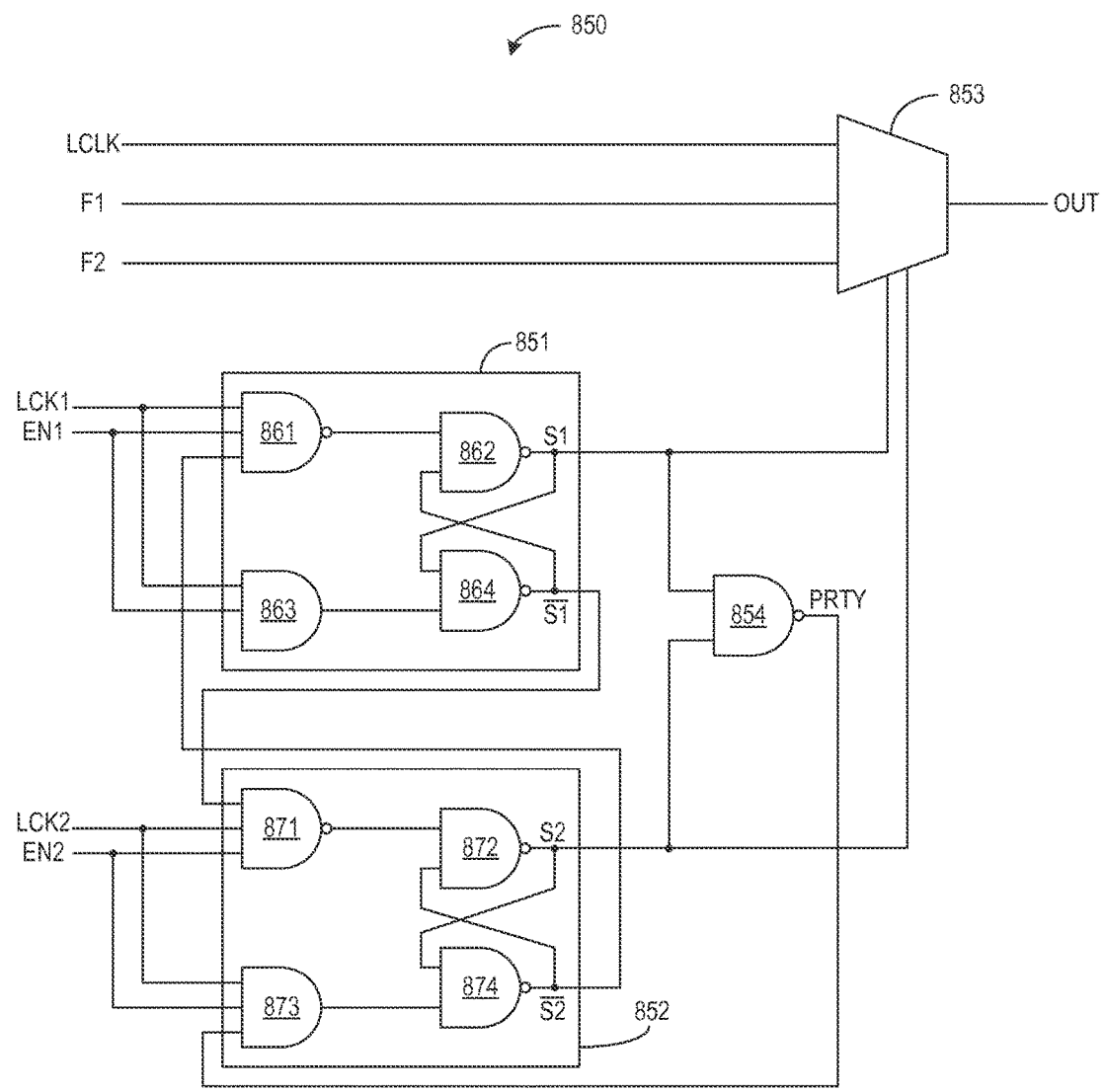
FIG. 8 illustrates generally an example arbitration circuit.

As briefly discussed above, in an example CDR with multiple channels and multiple forwarded frequency inputs arriving at a channel, an arbitration issue can arise. For example, when lock information and a lock signal is forwarded from more than one channel to a target channel or CDR circuit, an arbitration issue can arise. If lock signals arrive from more than one other channel, an arbitration circuit can be used to "decide" about which forwarded information will be used in the target CDR circuit. FIG. 8 illustrates generally an example arbitration circuit 850 for the case of two channels forwarding information to the target channel. This can easily be extended to any number of forwarding channels. In certain examples, the arbitration circuit can include 851 a first latch, a second latch 852, a multiplexer 853, and an arbiter NAND gate 854. Each latch 851, 852 can include four gates, an AND gate 863, 873 and three NAND gates 861, 862, 864, 871, 872, 874. The four gates 861, 862, 863, 864 of the first latch 851 and associated with the first latch output signal (S1, $\overline{S1}$) form a set-reset latch, and the four gates 871, 872, 973, 874 of the second latch 852 and associated with the second latch output signals (S2, $\overline{S2}$) form another set-reset latch. Each latch 851, 852 can be set when all three inputs to the associated NAND gate 861, 871 become active. An inactive input on any of the three inputs to the AND gate 863, 873 can reset the latch 851, 852. Each latch 851, 852 can receive an enable signal (EN1, EN2). The enable signals (EN1, EN2) are configuration enables indicating controlling whether the target channel associated with the arbitration circuit 850 can accept forwarded information from the two channels providing forwarded information such as a forwarded lock signal (LCK1, LCK2) and forwarded frequency information (F1, F2). If an enable signal (EN1, EN2) is inactive, all information from that source channel is ignored. The forwarded lock signal (LCK1, LCK2) can provide an indication from the associated source channel that it has successfully locked and any forwarded information from that source channel is valid.

When first enable signal (EN1) is active and the first forwarded lock signal (LCK1) is active, the first latch 851 can provide an active first output signal (S1), except when the first output signal (S2) of the second latch 852 is already active. When the first output signal (S2) of the second latch 852 is already active, the second output signal ($\overline{S2}$) of the second latch 852 signal can prevent the first output signal (S1) of the latch latch 851 from becoming active and propagating. Similarly, when the second enable signal (EN2) is active and the second forwarded lock signal (LCK2) is active, the second latch 852 can provide an active first output signal (S2), except when the first output signal (S1) of the first latch 851 is already active. This logic can give priority to the active forwarded lock signal (LCK1, LCK2) that arrives at the arbitration circuit 850 first, and can ignore active forwarded lock signals that arrive later. If a forwarded lock signal (LCK1, LCK2) becomes inactive, the associated select signal (S1, S2) can be de-asserted, and the arbitration circuit can again monitor for the forwarded lock signal (LCK1, LCK2) that becomes active next. If one of the forwarded lock signals (LCK1, LCK2) is already active, the associated select signal (S1, S2) can immediately become active. In the rare case of two, active, forwarded lock signals arriving at essentially the same time, and setting their associated select signal active simultaneously, in the illustrated example of FIG. 8, the arbiter NAND gate 854 can receive the select signals (S1, S2) from the first and second latches 851, 852 and an output signal (PRTY) of the arbiter NAND gate 854 can drive the first output (S1) of the second latch 852 inactive to correct the ambiguous state. The select signals (S1, S2) can be received by the multiplexer 853 to select which frequency information (LCLK, F1, F2) to pass to the channel associated with the arbitration circuit 850 as a reference frequency signal (OUT). If neither of the select signals (S1, S2) are active, the multiplexer 853 can optionally select, for example, a local clock signal (LCLK) if such a clock is available. In certain examples, the output of the multiplexer 853 can be used to drive one of the inputs of a type 4 PFD as discussed above.

ADDITIONAL NOTES AND EXAMPLES

In Example 1, a multiple channel communication circuit can include a plurality of clock and data recovery (CDR) circuits, each CDR circuit of the plurality of CDR circuits associated with a channel of the multiple channel communication circuit, and wherein each CDR circuit is configured to detect an incoming stream of data from the channel, to determine a setting of one or more parameters for correctly sampling the data from the incoming stream, and to share frequency information as a first setting of the one or more parameters to an additional CDR circuit of the plurality of CDR circuits.

In Example 2, each CDR circuit of Example 1 optionally includes a clock generator configured to provide a signal for sampling the data from the incoming stream, and the frequency information optionally includes a clock signal indicative of a target frequency for the clock generator.

In Example 3, the target frequency of any one or more of Examples 1-2 optionally is a multiple of a frequency of the clock signal.

In Example 4, the target frequency of any one or more of Examples 1-3 optionally is a frequency of the clock signal multiplied by one of 32, 64, 128 or 256.

In Example 5, each CDR circuit of any one or more of Examples 1-4 optionally includes an equalizer configured to frequency shape the incoming stream and each CDR circuit of any one or more of Examples 1-4 optionally is configured to share equalization information as a second setting of the one or more parameters to the additional CDR circuit of the plurality of CDR circuits.

In Example 6, the equalization information of any one or more of Examples 1-5 optionally includes spectral information associated with no-return to zero (NRZ) data.

In Example 7, the equalization information of any one or more of Examples 1-6 optionally includes spectral information associated with pulse-amplitude modulation (PAM) data.

In Example 8, a first CDR circuit of the plurality of CDR circuits of any one or more of Examples 1-7 optionally is configured to receive a first data stream having a first nominal frequency, and a CDR circuit of the plurality of CDR circuits of any one or more of Examples 1-7 optionally is configured to receive a second data stream having a second nominal frequency that is different than the first nominal frequency.

In Example 9, a method of operating a multiple channel communication circuit can include detecting an incoming streams of data on multiple channels of the multiple channel communication circuit, locking on to a first data stream of a first channel at a first clock and data recovery (CDR) circuit of the multiple channel communication circuit using a detection circuit, sharing frequency information associated with the locking on to the first data stream with a second CDR circuit of the multiple channel communication circuit, and adjusting, in response to the indication, one or more parameters of the second CDR circuit to successfully sample data of a second data stream of a second channel.

In Example 10, the locking on to a first data stream of any one or more of Examples 1-9 optionally includes adjusting one or more parameters of a detection circuit of the first CDR circuit to successfully sample data of the first data stream.

In Example 11, the method of any one or more of Examples 1-10 optionally includes sampling data of the first data stream using a clock signal of a signal generator of the first CDR circuit.

In Example 12, the method of any one or more of Examples 1-11 optionally includes adjusting equalization parameters of the first channel after the locking on, the adjusting the equalization parameters of the first channel configured to reduce errors in sampling data of the first data stream.

In Example 13, the method of any one or more of Examples 1-12 optionally includes sharing the equalization parameters of the first CDR circuit with the second CDR circuit.

In Example 14, a multiple channel communication circuit can include a plurality of clock and data recovery (CDR) circuits, each CDR circuit of the plurality of CDR circuits associated with a channel of the multiple channel communication circuit, wherein each CDR circuit is configured to detect an incoming stream of data from the channel, to determine a lock solution of one or more parameters for correctly sampling the data from the incoming stream, and to share the lock solution with an additional CDR circuit of the plurality of CDR circuits, and wherein the lock solution for each channel includes parameters associated with successfully sampling data of the incoming data stream associated with each channel.

In Example 15, the lock solution of any one or more of Examples 1-14 optionally is configured to include a sampling frequency information of a channel of the multi-channel communication circuit sharing the lock solution.

In Example 16, the lock solution of any one or more of Examples 1-15 optionally is configured to include a signal having a divided frequency of a sampling frequency of the channel of the multi-channel communication circuit sharing a lock solution.

In Example 17, the lock solution of any one or more of Examples 1-16 optionally is configured to include a signal indicative of a lock status of the channel of the multi-channel communication circuit sharing the lock solution.

In Example 18, the lock solution of any one or more of Examples 1-17 optionally is configured to include equalization information of the channel of the multi-channel communication circuit sharing the lock solution.

In Example 19, the equalization information of any one or more of Examples 1-18 optionally includes spectral information associated with no-return to zero (NRZ) data.

In Example 20, the equalization information of any one or more of Examples 1-19 optionally includes spectral information associated with pulse-amplitude modulation (PAM) data.

In Example 21, a multiple channel communication circuit can include a plurality of clock and data recovery (CDR) circuits, each CDR circuit of the plurality of CDR circuits associated with a channel of the multiple channel communication circuit, a master clock generator configured provide a sampling signal to each of the CDR circuits of the plurality of CDR circuits, and wherein each CDR circuit is configured to detect an incoming stream of data from the channel, to determine a sampling settings of one or more parameters for correctly sampling the data from the incoming stream, and to share one or more of the sampling settings to an additional CDR circuit of the plurality of CDR circuits.

In Example 22, the multiple channel communication circuit of any one or more of Examples 1-21 optionally includes a low, phase noise reference configured to provide a low-noise reference signal, and wherein the master clock generator is configured to receive the low noise reference signal and to provide the sampling signal.

In Example 23, the low-noise reference of any one or more of Examples 1-22 optionally includes a quartz crystal.

In Example 24, the master clock generator of any one or more of Examples 1-23 optionally includes a phase lock loop (PLL) configured to receive the low-noise reference signal and includes a fractional divider in a feedback loop of the PLL to provide the sampling signal with a desired sampling frequency.

In Example 25, the fractional divider of any one or more of Examples 1-24 optionally includes a phase accumulator configured to receive a first clock signal, the phase accumulator having a plurality of registers, wherein one or more of the registers are configured to accept a frequency control word, a stall circuit configured to selectively disable one or more of the registers in order to stall the phase accumulator, and a phase select circuit configured to select one or more phases based on one or more output bits from the phase accumulator.

In Example 26, each CDR circuit of any one or more of Examples 1-25 optionally includes an interpolator configured to receive the sampling signal and configured to adjust a phase of the sampling signal to correctly sample data of an incoming data stream.

Example 27 can include, or can optionally be combined with any portion or combination of any portions of any one or more of Examples 1 through 26 to include, subject matter that can include means for performing any one or more of the functions of Examples 1 through 26, or a machine-readable medium including instructions that, when performed by a machine, cause the machine to perform any one or more of the functions of Examples 1 through 26.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A multiple channel communication circuit comprising:
a plurality of clock and data recovery (CDR) circuits, each CDR circuit of the plurality of CDR circuits associated with a channel of the multiple channel communication circuit; and
wherein each CDR circuit includes an input configured to receive an incoming stream of data from the channel; and
wherein each CDR circuit is configured to detect the incoming stream of data from the channel, to determine a setting of one or more parameters for correctly sampling the data from the incoming stream, and to share the one or more parameters with an additional CDR circuit of the plurality of CDR circuits using a different input than the input for receiving the incoming stream of data.

2. The multiple channel communication circuit of claim 1, wherein each CDR circuit includes a clock generator configured to provide a sample signal for sampling the data from the incoming stream; and
wherein the clock signal is indicative of a target frequency for the clock generator.

3. The multiple channel communication circuit of claim 2, wherein the target frequency is a multiple of a frequency of the clock signal.

4. The multiple channel communication circuit of claim 2, wherein the target frequency is a frequency of the clock signal multiplied by one of 32, 64, 128 or 256.

5. The multiple channel communication circuit of claim 1, wherein each CDR circuit includes an equalizer configured to frequency shape the incoming stream; and
wherein each CDR circuit is configured to share equalization information as a second setting of the one or more parameters to the additional CDR circuit of the plurality of CDR circuits.

6. A multiple channel communication circuit of 5, wherein the equalization information includes spectral information associated with no-return to zero (NRZ) data.

7. A multiple channel communication circuit of 5, wherein the equalization information includes spectral information associated with pulse-amplitude modulation (PAM) data.

8. A multiple channel communication circuit of 1, wherein a first CDR circuit of the plurality of CDR circuits is configured to receive a first data stream having a first nominal frequency; and
  wherein a CDR circuit of the plurality of CDR circuits is configured to receive a second data stream having a second nominal frequency that is different than the first nominal frequency.

9. A method of operating a multiple channel communication circuit, the method comprising:
  detecting an incoming streams of data on multiple channels of the multiple channel communication circuit;
  locking on to a first data stream of a first channel at a first clock and data recovery (CDR) circuit of the multiple channel communication circuit using a detection circuit;
  adjusting equalization parameters of the first channel after the locking on, the adjusting the equalization parameters of the first channel configured to reduce errors in sampling data of the first data stream;
  generating and sharing a clock signal associated with the locking on to the first data stream with a second CDR circuit of the multiple channel communication circuit, wherein the clock signal is separate from the incoming streams of data; and
  adjusting, in response to the indication, one or more parameters of the second CDR circuit to successfully sample data of a second data stream of a second channel.

10. The method of claim 9, wherein the locking on to a first data stream includes adjusting one or more parameters of a detection circuit of the first CDR circuit to successfully sample data of the first data stream.

11. The method of claim 9, including sampling data of the first data stream using a clock signal of a signal generator of the first CDR circuit.

12. The method of claim 9, including sharing the equalization parameters of the first CDR circuit with the second CDR circuit.

13. A multiple channel communication circuit comprising:
  a plurality of clock and data recovery (CDR) circuits, each CDR circuit of the plurality of CDR circuits associated with a channel of the multiple channel communication circuit; and
  wherein each CDR circuit is configured to detect an incoming stream of data from the channel, to determine a lock solution of one or more parameters for correctly sampling the data from the incoming stream, and to share the lock solution with an additional CDR circuit of the plurality of CDR circuits, wherein the lock solution for each channel includes a clock signal associated with successfully sampling data of the incoming data stream associated with each channel;
  wherein the lock solution is shared separately from the incoming stream of data; and
  wherein the lock solution is configured to include equalization information of the channel of the multi-channel communication circuit sharing the lock solution.

14. The multiple channel communication circuit of claim 13, wherein the clock signal is configured to include a divided frequency of a sampling frequency of the channel of the multi-channel communication circuit sharing the lock solution.

15. The multiple channel communication circuit of claim 13, wherein the lock solution is configured to include a signal indicative of a lock status of the channel of the multi-channel communication circuit sharing the lock solution.

16. The multiple channel communication circuit of claim 13, wherein the equalization information includes spectral information associated with no-return to zero (NRZ) data.

17. The multiple channel communication circuit of claim 13, wherein the equalization information includes spectral information associated with pulse-amplitude modulation (PAM) data.

18. A multiple channel communication circuit comprising:
  a plurality of clock and data recovery (CDR) circuits, each CDR circuit of the plurality of CDR circuits associated with a channel of the multiple channel communication circuit;
  a master clock generator configured provide a sampling signal to each of the CDR circuits of the plurality of CDR circuits;
  a low, phase noise reference configured to provide a low-noise reference signal;
  wherein each CDR circuit is configured to detect an incoming stream of data from the channel, to determine a sampling settings of one or more parameters for correctly sampling the data from the incoming stream, and to share one or more of the sampling settings to an additional CDR circuit of the plurality of CDR circuits; and
  wherein the master clock generator is configured to receive the low noise reference signal and to provide the sampling signal.

19. The multiple channel communication circuit of claim 18, wherein the low-noise reference includes a quartz crystal.

20. The multiple channel communication circuit of claim 18, wherein the master clock generator includes a phase lock loop (PLL) configured to receive the low-noise reference signal and includes a fractional divider in a feedback loop of the PLL to provide the sampling signal with a desired sampling frequency.

21. The multiple channel communication circuit of claim 18, wherein the fractional divider includes:
  a phase accumulator configured to receive a first clock signal, the phase accumulator having a plurality of registers, wherein one or more of the registers are configured to accept a frequency control word;
  a stall circuit configured to selectively disable one or more of the registers in order to stall the phase accumulator; and
  a phase select circuit configured to select one or more phases based on one or more output bits from the phase accumulator.

22. The multiple channel communication circuit of claim 18, wherein each CDR circuit includes an interpolator configured to receive the sampling signal and configured to adjust a phase of the sampling signal to correctly sample data of an incoming data stream.

* * * * *